US009737992B2

(12) United States Patent
Mougin et al.

(10) Patent No.: US 9,737,992 B2
(45) Date of Patent: Aug. 22, 2017

(54) AUTOMATIC AUTOMATED INSTALLATION (71) Applicant: SIDEL PARTICIPATIONS, Octeville-sur-Mer (FR)

(72) Inventors: Didier Mougin, Octeville-sur-Mer (FR); Gael Cheron, Octeville-sur-Mer (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 0 days.

(21) Appl. No.: 14/384,454

(22) PCT Filed: Mar. 11, 2013

(86) PCT No.: PCT/FR2013/050503
§ 371 (c)(1),
(2) Date: Sep. 11, 2014

(87) PCT Pub. No.: WO2013/136002
PCT Pub. Date: Sep. 19, 2013

(65) Prior Publication Data
US 2015/0112483 A1    Apr. 23, 2015

(30) Foreign Application Priority Data
Mar. 12, 2012 (FR) ...................... 12 52192

(51) Int. Cl.
*G05B 19/18* (2006.01)
*B25J 9/16* (2006.01)
(Continued)

(52) U.S. Cl.
CPC ........... *B25J 9/1676* (2013.01); *B25J 9/0096* (2013.01); *B25J 9/1694* (2013.01); *B25J 19/06* (2013.01);
(Continued)

(58) Field of Classification Search
CPC combination set(s) only.
See application file for complete search history.

(56) References Cited

U.S. PATENT DOCUMENTS 5,428,279 A * 6/1995 Sugimoto ............... B25J 19/06
318/445
5,602,967 A * 2/1997 Pryor ................... A01B 69/008
700/252
(Continued)

FOREIGN PATENT DOCUMENTS

EP    2 186 761 A1    5/2010
FR    2 921 636 A1    4/2009

OTHER PUBLICATIONS

International Search Report of PCT/FR2013/050503 dated May 23, 2013.

*Primary Examiner* — Bhavesh V Amin
(74) *Attorney, Agent, or Firm* — Sughrue Mion, PLLC (57) ABSTRACT The invention relates to an automatic automated installation in which at least one robot (2) is used in at least one mode of operation in at least one work zone (3). The installation comprises a closed space (1) equipped with at least one door (4) offering access to at least one operator intervention work station (6) which is situated in said work zone (3) of said robot, and means (7) for detecting the presence of an element (25; 26) in said closed space (1) at said operator intervention work station (6). The detection means (7) are arranged in said closed space (1) to delimit at least two zones (8, 9, 10) and are also associated with means (21) for control of said at least one mode of operation of the robot (2), each zone (8, 9, 10) being associated with one mode of operation of the robot (2). The detection means (7) are positioned a predetermined height from a floor (18) of said space (1), said height being greater than the height of an empty pallet (12).

19 Claims, 11 Drawing Sheets (51) Int. Cl.
*B25J 19/06* (2006.01)
*B25J 9/00* (2006.01)

(52) U.S. Cl.
CPC .............. *G05B 2219/39082* (2013.01); *G05B 2219/40006* (2013.01); *Y10S 901/09* (2013.01)

(56) References Cited

U.S. PATENT DOCUMENTS

| | | | |
|---|---|---|---|
| 6,778,867 B1* | 8/2004 | Ziegler | B25J 9/1674 318/563 |
| 2004/0089793 A1 | 5/2004 | Watanabe et al. | |
| 2007/0113991 A1* | 5/2007 | Mangelsen | B25J 19/06 160/340 |
| 2007/0211395 A1 | 9/2007 | Svensson et al. | |
| 2008/0021597 A1* | 1/2008 | Merte | F16P 3/14 700/255 |
| 2009/0060693 A1* | 3/2009 | Takahashi | B25J 9/0093 414/222.02 |
| 2009/0072631 A1* | 3/2009 | Iida | B25J 19/06 307/326 |
| 2010/0125361 A1* | 5/2010 | Mougin | B25J 9/1676 700/217 |
| 2010/0179690 A1 | 7/2010 | Matthias et al. | |
| 2010/0310349 A1 | 12/2010 | Bonhomme | |
| 2012/0163953 A1* | 6/2012 | Murano | B25J 9/0093 414/788.1 |

\* cited by examiner

FIG. 1

FIG. 3 BIS

AUTOMATIC AUTOMATED INSTALLATION

CROSS REFERENCE TO RELATED APPLICATIONS

This is a National Stage of International Application No. PCT/FR2013/050503 filed Mar. 11, 2013, claiming priority based on French Patent Application No. 12 52192 filed Mar. 12, 2012, the contents of all of which are incorporated herein by reference in their entirety.

FIELD OF THE INVENTION

The invention relates to an automatic automated installation in which a robot is used in at least one mode of operation.

DESCRIPTION OF THE PRIOR ART

Usually, and for reasons of safety, such an installation comprises a closed space in which the robot manoeuvres, and stacks products on a pallet positioned at a palletizing station. A door situated in front of the palletizing station allows an operator to enter and retrieve the pallet when it is full.

Again for reasons of safety, the space is equipped with detection means which, when they detect the presence of a person in the space or that the door has been opened at an unsuitable time, trigger the securing of the installation, stopping the robot and cutting off the power supply to the installation.

An installation is known from FR 2 848 339 which is equipped with such detection means and which provides a cradle that ensures the positioning of a pallet up to the palletizing station or which initiates the exiting of the pallet from the space, such that an operator does not have to enter the space to retrieve a full pallet or to install a new pallet.

Such an installation ensures optimum safety for the operator, but limits productivity.

In fact, if the operator has to enter the space for any reason (for example to retrieve a product for quality control), the installation is secured. The result is that the robot is not productive when the space is open and for the whole time that the installation is secured, or even for the whole time needed to switch the installation back on after a securing of the latter.

The invention aims to overcome these drawbacks by proposing a novel installation which is more productive than that mentioned above, while ensuring the safety of the operators who retrieve full pallets from the spaces or reposition empty pallets in the palletizing zones.

SUMMARY OF THE INVENTION

The invention relates to an automatic automated installation in which at least one robot is used in at least one mode of operation in at least one work zone, said installation comprising
- a space equipped with at least one door offering access to at least one operator intervention station, said at least one operator intervention station being situated in said work zone of said robot,
- means for detecting the presence of an element in said closed space at said operator intervention station.

The installation comprises detection means which are arranged in said closed space to delimit at least two zones and which are also associated with means for control of said at least one mode of operation of the robot, each zone delimited by the detection means being associated with a mode of operation of the robot.

Such an automated installation is known, and is described for example in US 2010 179 690.

Thanks to the delimitation of several zones, each controlling a particular mode of operation of the robot, it is possible to make the robot work continuously or at the very least to the maximum within the limits of the safety standards in force, while ensuring the safety of the individuals who might enter the space.

In fact, thanks to these features, the installation allows a mode of operation of the robot which is not dangerous for the operator entering the space.

However, such an installation is not designed for a palletizing activity.

As for the invention, it is designed specifically to ensure a palletizing of products in two zones, and it makes it possible to increase the production of the robot by limiting the stops and stopping times thereof: in fact, thanks to the invention, it is possible to stop the robot from operating without the whole machine being stopped (secured).

The invention is notable in that the detection means are positioned at a predetermined height from a floor of said space, said height being greater than the height of an empty pallet.

In this manner, the presence or absence of a pallet is not detected by the detection means. The introduction of a pallet or its presence in the work zones therefore does not interfere with the mode of operation of the robot.

However, the space can be equipped with other means that make it possible to detect the presence of a pallet in a work zone, so as to allow, or not allow, the robot to work in the zone in order to place the products on the pallet.

These second detection means are, however, independent of the means for detecting the presence of elements or an object in the predetermined zones, positioned at a certain height from the floor.

Another technical solution, specific to the invention, relates to an automatic automated installation as defined above which is notable in that the detection means comprise a camera capable of scanning said at least two delimited zones in the space, said at least two zones being situated above a predetermined height from a floor (18) of said space (1), said height being greater than the height of an empty pallet (12).

According to this embodiment, the camera (which constitutes the detection means) could be positioned anywhere in the space, including below the level of a pallet (for example on the floor). However, in its mode of operation for monitoring said at least two zones (each associated with one mode of operation of the robot), it would not take into consideration the zone situated below the higher level of the pallet. In this manner, the means for detecting the presence or absence of the pallet remain independent of the means for detecting the zones associated with the working modes of the robot.

Moreover, the invention has another benefit: with the installations of the state of the art it was necessary to train the operators to make the installation operate: the operators had to know how to restart operation of the installation when it had been secured: for example, the installation had to be reset first, then the detection means had to be activated before authorizing the restart of the robot of the installation . . . . This was done by pressing a series of buttons on a control station of the installation.

Thanks to the invention, the machine is no longer secured as soon as the space in which the robot works is opened.

None of the operations that an operator had to know in order to restart the installation are necessary any more, because the installation according to the invention guarantees the safety of the operator without securing the installation, simply by stopping the robot.

The invention has moreover been developed because a new standard (ISO 10 218-1 and ISO 10 218-2) has been introduced which authorizes an operator to enter a space in which a robot is working, provided that certain requirements are met.

The invention meets these requirements and improves the ergonomics of operating the automatic automated installations.

The invention can also comprise the following characteristics, taken separately or in combination:
- said at least two zones each associated with one mode of operation of the robot can at least partially cover said at least one operator intervention station;
- the installation can comprise two operator intervention stations comprised in said work zone of the robot, in that the space comprises at least two openings for access to the two operator intervention stations and a door fitted so as to be mobile between said at least two openings, as well as sensors for the presence of the door at each of said at least two openings,
- the detection means can delimit:
  - a first zone in said space, said first zone controlling the triggering of a warning signal for the entry of said element into said space, and authorizes a mode of operation of the robot at a predetermined pace,
  - a second zone in said space, said second zone controlling a mode of operation of the robot at a pace that has been slowed down compared with said predetermined pace,
  - a third zone in said space, said third zone controlling the stopping of the operation of the robot;
- the detection means can comprise a laser scanner of said space;
- the detection means can comprise sensors;
- the detection means can comprise a camera;
- the installation can be equipped with at least one sensor for the presence of a pallet in said at least one operator intervention station;
- the installation can be equipped with means for detecting a full pallet;
- the means for control of said at least one mode of operation of the robot can be associated with safety control means;
- the safety control means can identify at least one sequence of modes of operation of the robot and authorize or not authorize the robot which is at a stop to work again, or trigger the stopping of the installation;
- said at least one operator intervention station can be a palletizing station and said detected element can be an operator or a pallet truck.

The invention also relates to particular methods of operation for using an installation as defined above.

In particular, following a method according to the invention, using an installation also according to the invention comprising two operator intervention stations, two openings into the space and a single door, the following steps are used:
- at the operator intervention station situated behind an opening the sensor of which detects the presence of a door, the control means control the use of a mode of operation of the robot in the operator intervention station situated behind the door and,
- at the operator intervention station situated behind an opening the sensor of which does not detect a door, the control means bar the robot from having access, and they activate the use of the detection means.

Following another method according to the invention, using an installation in which the safety control means identify at least one sequence of modes of operation of the robot, the identified sequence is as follows:
- detection of an intrusion in a first warning zone not changing the mode of operation of the robot and triggering an audible or visual indicator,
- detection of an intrusion in a second zone controlling an operation of the robot at a slowed-down pace,
- detection of an intrusion in a third zone controlling the stopping of the robot,
- detection again of an intrusion in said second zone,
- and detection again of an intrusion in said first zone.

Finally, following yet another method according to the invention, using an installation equipped with means for detecting a full pallet, the following steps are carried out:
- triggering of the opening of the door to authorize access to said operator intervention station,
- inhibition of the means for control of the mode of operation of the robot,
- monitoring of a complete exit of said full pallet from said installation by detecting the presence of the full pallet in a third zone, then in a second zone, then in a first zone delimited by said detection means of said installation.

BRIEF DESCRIPTION OF THE DRAWINGS

To enable it to be carried out, the invention is disclosed in a sufficiently clear and complete manner in the following description, which is moreover accompanied by drawings in which.

DETAILED DESCRIPTION OF THE INVENTION

Figure 1:
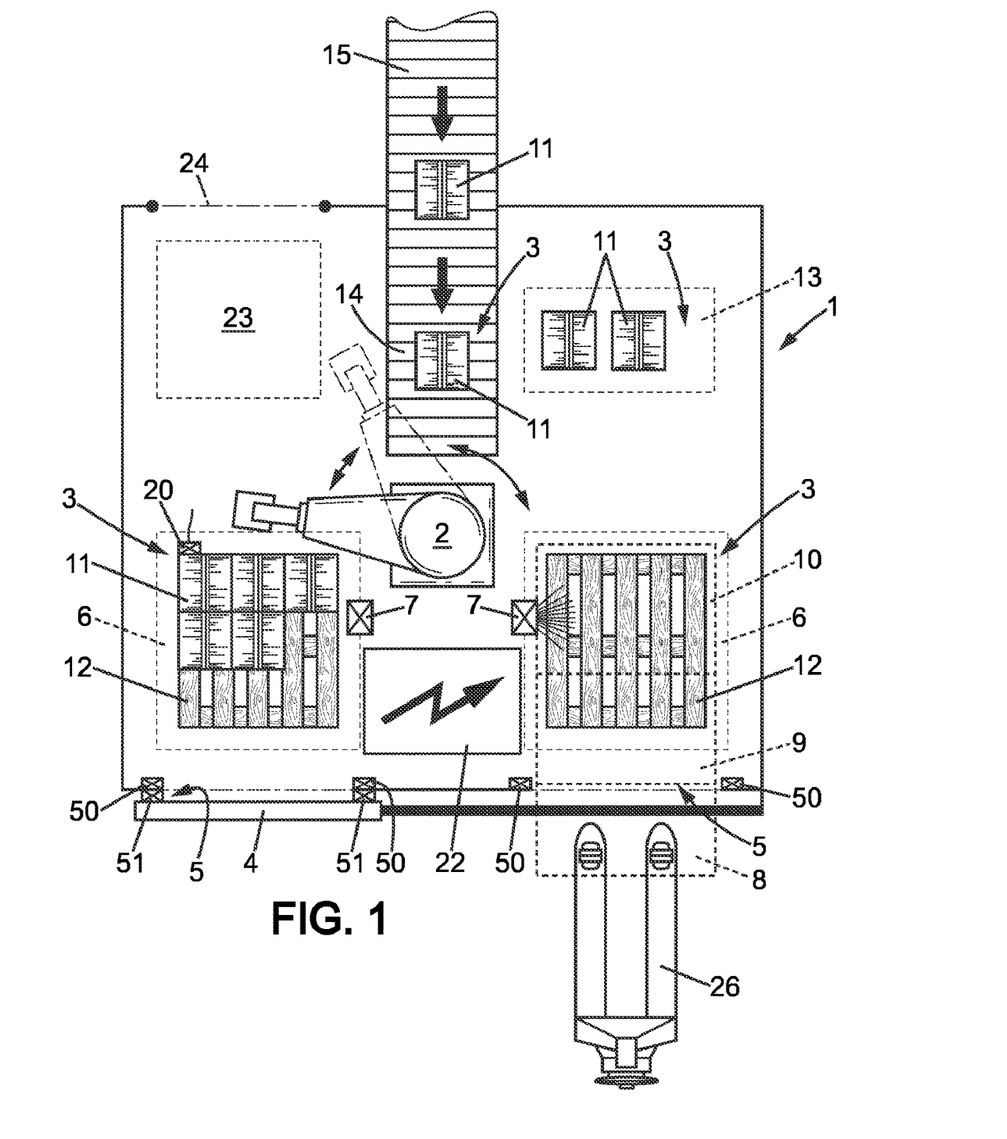
FIG. 1 shows diagrammatically, in a top view, an installation according to the invention.

The installation shown in FIG. 1 is an automatic automated installation.

It comprises a closed space 1 in which a robot 2 is used.

In particular, the robot 2 can operate in several modes of operation, i.e. it can carry out several different movements or carry out the same movements but at different rates, for example. The robot 2 thus operates in at least one mode of operation.

The robot 2 works in a zone 3 called a "work zone": this is a zone situated in the space and in which it is authorized to work.

Specifically, the robot 2 is authorized to work in four zones—zone 3 therefore comprises four sub-zones: two zones bearing the reference 6, which will also be called operator intervention stations hereinafter, and in each of which the robot 2 positions products 11 on pallets 12 according to a given pattern, a zone 13, which is a buffer zone in which the robot 2 can stack several products 11 when it is not authorized to work at the operator intervention stations 6, and an infeed zone 14 for the products 11.

The infeed zone 14 for the products 11 comprises the end of an infeed conveyor 15 for the products 11 which have been prepared upstream. To allow the infeed of the products 11 up to the robot 2, the space 1 comprises a window 16 through which the infeed belt of the conveyor 15 passes. The window 16 can be equipped with vertical flexible strips 17 that allow the space to be kept closed.

The closed space 1 is equipped with a door 4 which is fitted so as to be mobile between two openings 5.

Behind each opening 5 there is an operator intervention station 6, i.e. a station in which an operator can intervene, either because there is something to be taken out of there or because there is something to be put in there or because something needs to be checked there. As also shown above, the operator intervention station 6 is also a station in which the robot is authorized to work. In this way the operator intervention stations 6 are comprised within the work zone 3 of the robot 2.

Each opening 5 comprises sensors 50 which detect the presence of the door 4. The door 4 can also comprise sensors 51 for contacting the sensors 50 when it is correctly positioned in front of the opening 5.

Figure 2:
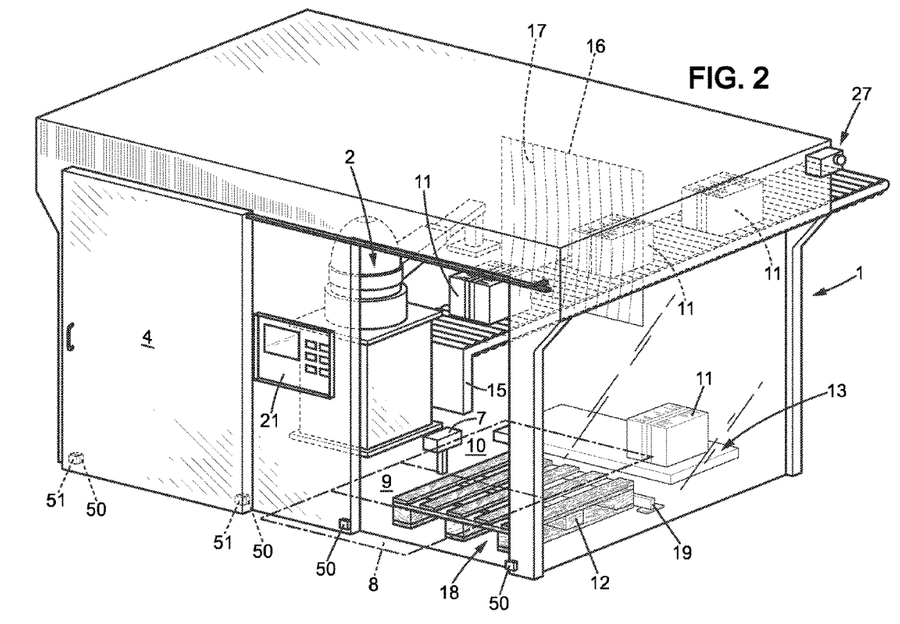
FIG. 2 is a partial perspective view of the installation shown in FIG. 1.

As can be seen in FIG. 1 or in FIG. 2, the installation also comprises detection means 7, which detect the presence of an element in the space, and in particular at an operator intervention station 6.

Just as in the example shown, there are two operator intervention stations 6, the installation comprises two detection means 7, each means 7 being arranged in an operator intervention station 6 or close to the latter.

As can also be seen, the detection means 7 are arranged to delimit several zones in the space or close to it. These three zones bear the references 8, 9 and 10 in the figures.

As can be seen, the three zones 8, 9 and 10 at least partially cover the operator intervention station 6.

The detection means 7 can be realized by sensors, by a camera (in which case the camera will be associated with image analysis means) and, within the framework of this preferred embodiment, the detection means 7 comprise a laser scanner 7.

Figure 4:
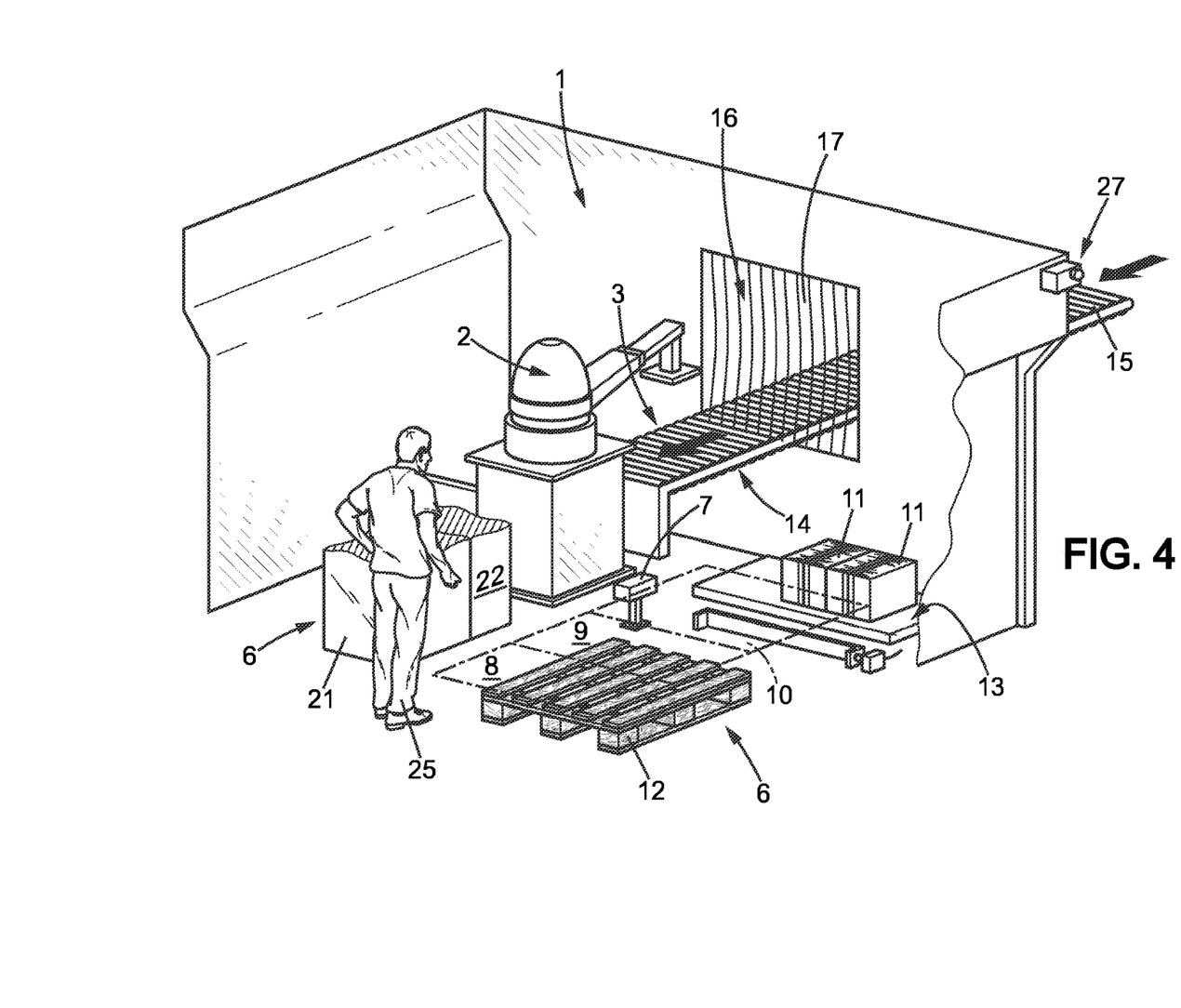
FIG. 4 shows the installation of FIG. 3, in which an empty pallet is in the process of being inserted.

As can be seen in particular in FIGS. 2 and 4, the laser scanner 7 is positioned at a predetermined height from the floor 18 of the space 1.

The height of the laser scanner 7 is calculated so as to be greater than that of a pallet 12: in this way the laser of the scanner 7 does not detect the presence of a pallet 12 placed in the space, at the operator intervention station 6.

However, the space is equipped with means that allow the presence of a pallet in an operator intervention zone 6 to be detected.

Figure 3:
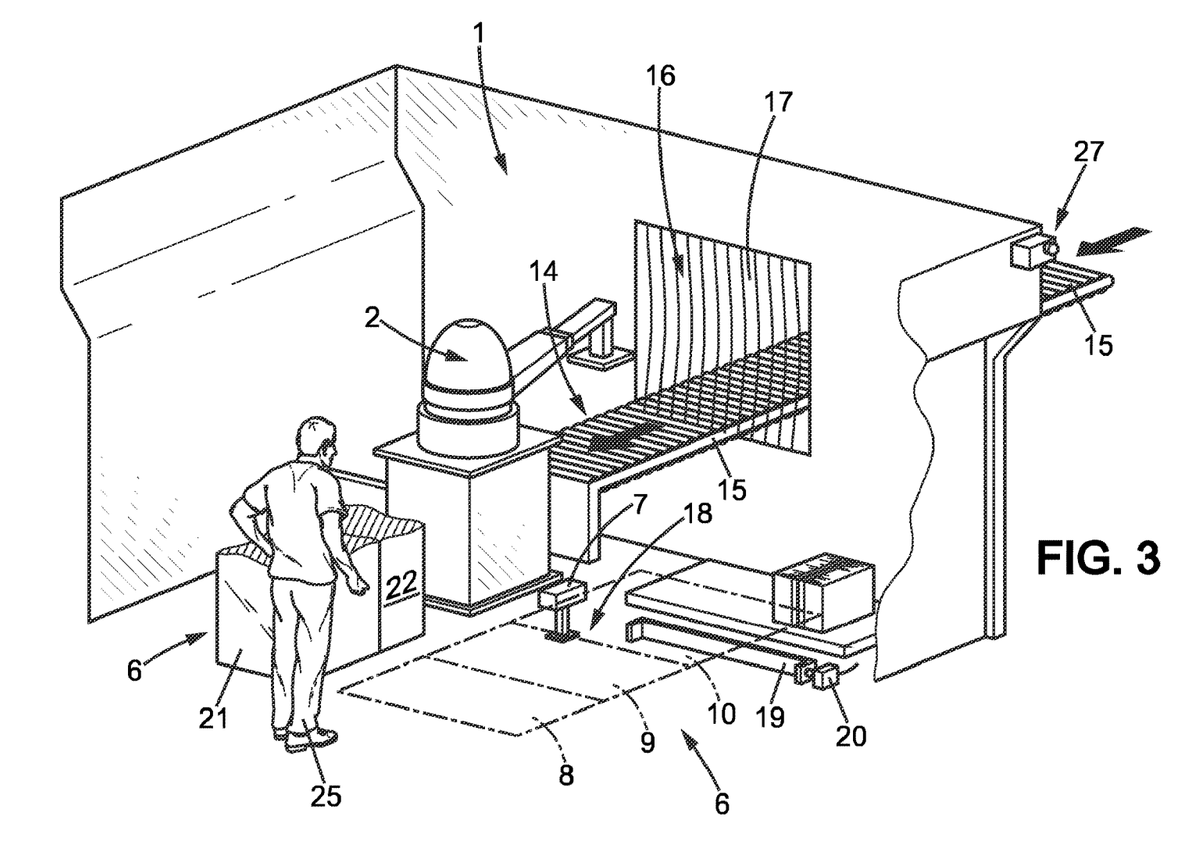
FIG. 3 is another partial perspective view of the installation shown in FIGS. 1 and 2, showing the detection means defining three zones in the space and/or outside the space but close to it, as well as an operator, FIG. 3 bis shows the same installation as the one illustrated in FIG. 3, in a partial perspective view, but with different detection means from those illustrated in FIG. 3.

These detection means are realized by a positioning stop 19 for a pallet 12, in the shape of a U, placed at the end of the zone 6 (FIG. 3).

A sensor 20 for the presence of a pallet is positioned on the stop, such that when a pallet 12 is positioned against the U-shaped stop 19 the sensor 20 detects the presence of this pallet 12.

The stop 19 could have a shape other than that of a U, as shown for example in FIG. 2, without exceeding the scope of the invention.

As shown in FIGS. 1 and 2 for example, the space can also be equipped with means 21 for control of the installation and in particular of the operation of the robot 2, such as a computer or a control unit, an electrical cabinet 22, and optionally another internal station 23 (FIG. 1) that can be accessed for example through a back door 24. The station 23 can be for example a quality control station, in which the robot 1 at intervals sets down a product 11 so that it can be checked by an operator.

In the case of the example shown in FIG. 3 bis, the detection means 7 are realized by a camera, associated with image analysis means (not shown). The camera is positioned on the floor and delimits the three abovementioned zones 8, 9 and 10. The three zones 8, 9 and 10 can be volumes, as shown in FIG. 3 bis.

The zones 8, 9 and 10 are delimited starting from a level n which is greater than the higher level of a pallet. This is possible thanks to the image analysis means associated with the camera.

Reference will now be made to features of the installation according to the invention, with reference to the embodiment which uses a laser scanner as detection means.

When it is activated, the scanner 7 delimits three zones 8, 9 and 10 in the operator intervention station 6, as was seen previously.

The scanner 7 is activated when the sensors 50 of the opening 5 detect the absence of the door 4 (for example when they are not opposite the sensors 51) and when, in the operator intervention station 6, there is no pallet 12 or there is a pallet 12 and this pallet is empty.

In this configuration, the laser scanner 7 is also in electronic contact with means for control of the operation of the robot 2.

It will be assumed that the means for control of the mode of operation of the robot 2 form part of the means that control the operation of the installation, i.e. the control means 21.

Each zone 8, 9 or 10 is associated with a particular mode of operation of the robot 2.

Within the framework of the embodiment currently being described, the zone 8 which exceeds the space is associated with a normal mode of operation of the robot 2 and with the emission of an alarm 27 (FIG. 2 in particular). This alarm 27 can be visual and/or audible. For example, when an element (an operator 25 or a pallet truck 26) enters the zone 8 and cuts through the field of the laser, the robot continues to operate normally but an audible message sounds via the alarm 27 in order to warn the operator 25, for example, that he is entering a secured zone.

The zone 9 is located just behind the zone 8 but, this time, completely inside the space. The zone 9 is associated with a mode of operation of the robot which is slowed down. In other words, when an element enters the zone 9, the work rate of the robot 2 is automatically slowed down.

The zone 10 is located in the middle of the space, very close to the robot 2. Also, and for safety reasons, when an element enters the zone 10, the robot is put on standby: it stops.

To allow control of the mode of operation of the robot associated with each detection zone of the scanner 7, the latter is, of course, connected to the means 21 for control of the operation of the robot.

For the sake of legibility of the figures, the connection cables of the scanner 7 connected to the control means 21 have not been shown.

Figure 5:
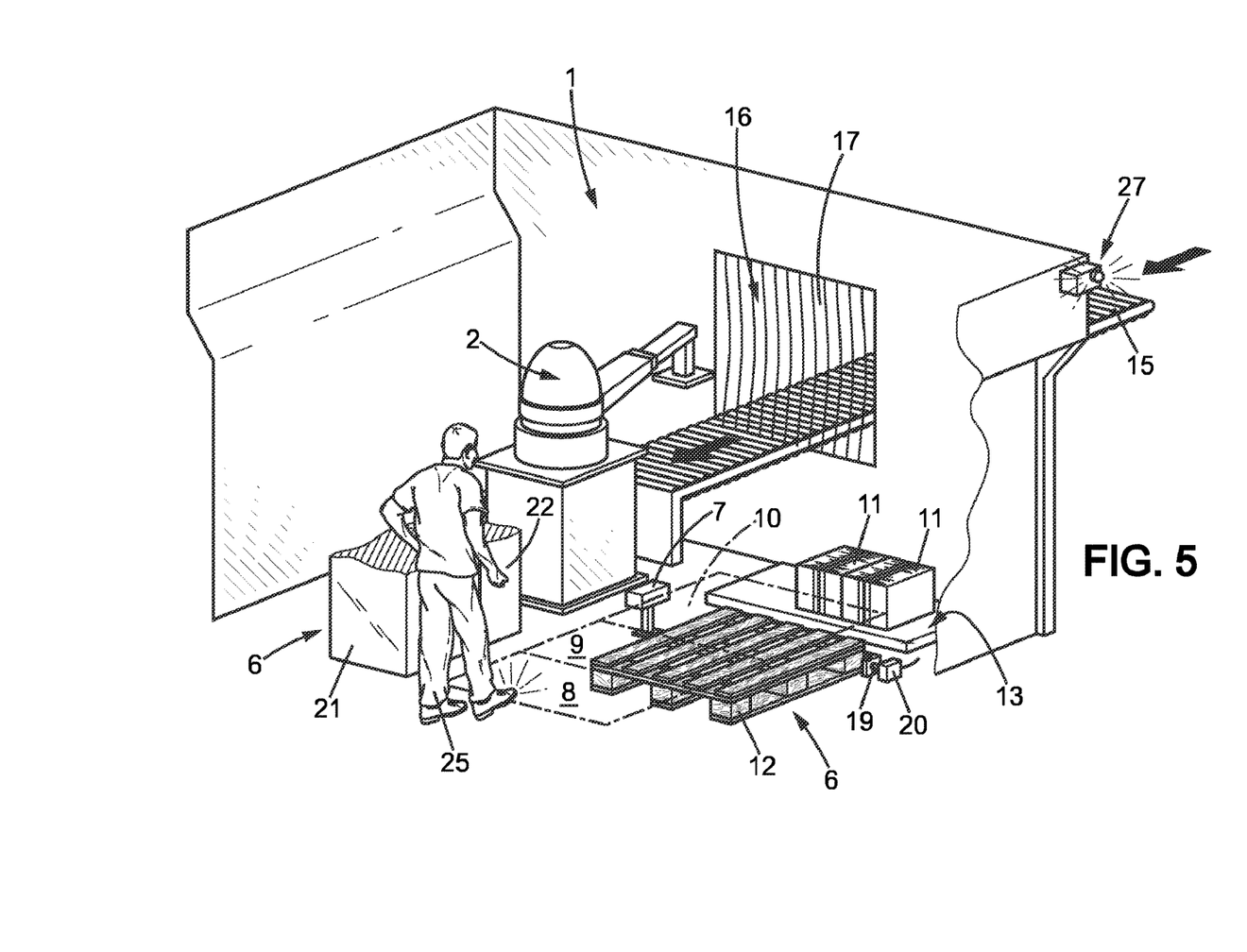
FIG. 5 shows the installation of FIG. 3, in which an empty pallet is completely inserted in a location dedicated to it, and in which the operator enters a first zone defined by the detection means.

Specifically, the robot 2 is connected to interface with the control means 21 as well as the laser scanner 7 and the sensors 50, 51 and 20, to ensure the operation of the installation according to the following description, with reference firstly to FIGS. 4 and 5.

In the installation 1 as shown in FIGS. 4 and 5, the operator intervention stations 6 are empty.

The robot 2 is at a stop, above the infeed zone 14 for the products 11. In fact, when the sensors 20 for the presence of a pallet, in each of the two work zones 3 (which are also the operator intervention stations 6), do not detect a pallet 12, then the robot 2 can stack products 11 in the buffer zone 13. If the zone 13 already comprises a certain number of products 11 (predetermined quantity), then the robot 2 is stopped.

To understand the operation of the installation it will be supposed that, in FIGS. 4 to 8, the door 4 (not shown) closes the opening 5 situated on the left of the installation (left-hand part of the installation likewise not shown).

The opening 5 of the right-hand side of the installation 1 therefore is not closed by the door.

The sensors 50 of the right-hand opening 5 therefore indicate to the control means 21 that the right-hand opening 5 is not closed.

The control means 21 therefore activate the laser scanner 7 of the right-hand operator intervention station 6.

When the operator 25 introduces a pallet 12 into the right-hand operator intervention station 6, no signal is transmitted by the laser scanner 7 to the control means 21, because the pallet 12 passes below the level of the laser of the scanner 7. The pallet 12 therefore is not detected.

When the pallet 12 is placed abutting the positioning stop 19 in the operator intervention station 6 (FIG. 5), the sensor 20 detects the presence of the pallet 12 and alerts the control means 21.

The control means 21 will authorize the robot 2 to stack the products 11 on the pallet 12 which has just been positioned only when the door 4 has been closed in front of the right-hand opening 5.

For the time being, when the operator enters the zone 8 (see FIG. 5), placing the empty pallet 12 in the operator intervention station 6, the audible and/or visual alarm is actuated because the scanner 7 has detected the incursion of the operator 25 into the zone 8.

When he withdraws, the operator 25 exits the zone 8 and the alarm 27 stops.

When the operator 25 closes the door 4, the control means 21 then authorize the robot to work at the right-hand operator intervention station 6, and the scanner 7 of the right-hand operator intervention station 6 is deactivated.

It is now assumed that the robot 2 has worked in the right-hand operator intervention station 6 in such a way that the pallet 12 is now full.

The robot 2 is programmed to produce n rows of N products 11, on x levels. The robot 2 therefore knows when a pallet 12 is full: the pallet 12 is full as far as the robot 2 is concerned when it has finished producing the filling pattern given to it.

This in itself constitutes means for detecting a full pallet.

When the robot 2 considers that the pallet 12 is full (because it has finished the filling pattern), it alerts the control means 21, which then authorize the opening of the door 4. As the door 4 opens, this activates the laser scanner 7. However, although the full pallet 12 is present in the zone 10, which would normally control the stopping of the robot 2, the "full pallet" signal received by the control means inhibits the control of the mode of operation of the robot as a function of the zones of the scanner, until the pallet has been completely removed from the installation.

Figure 6:
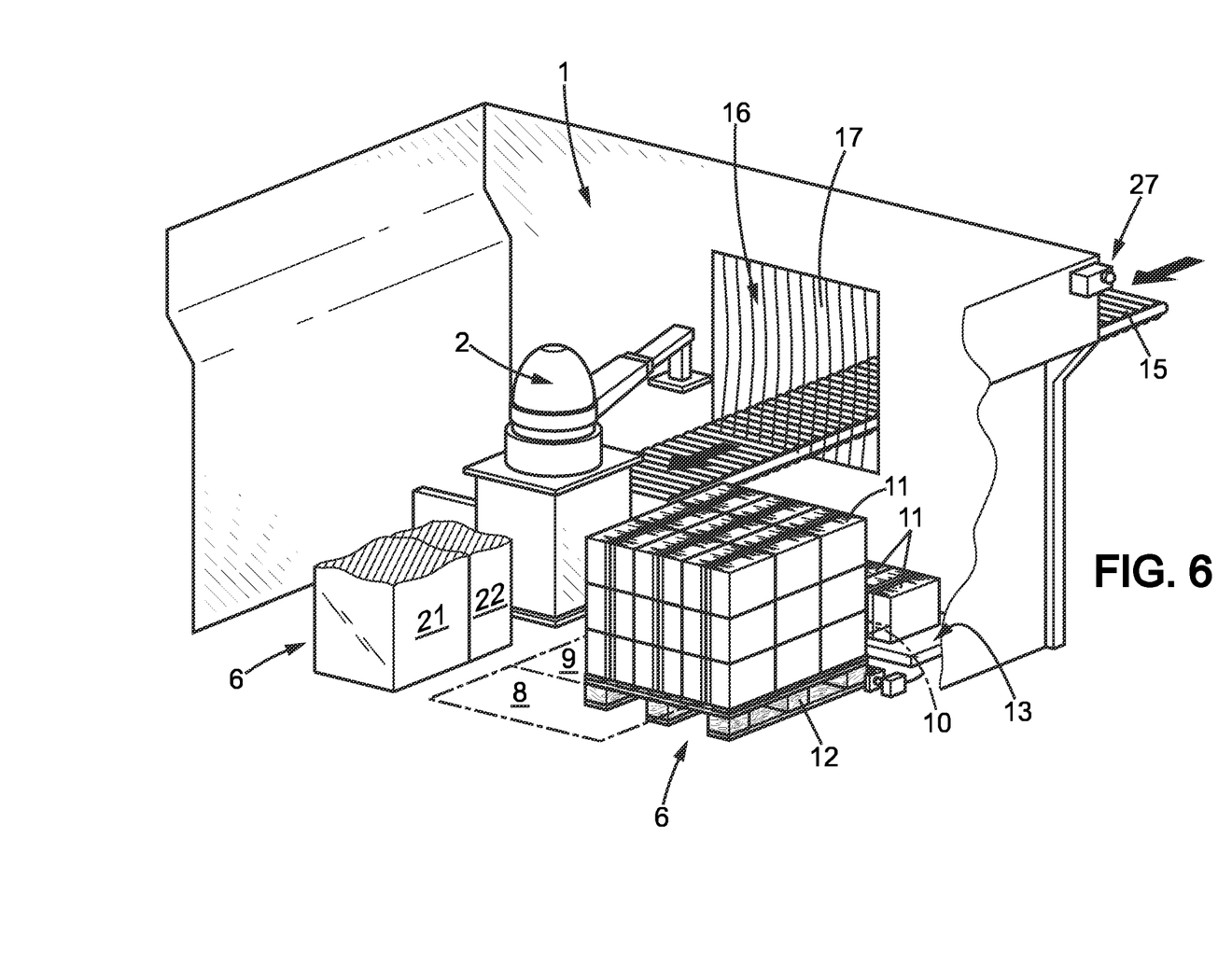
FIG. 6 shows the installation of FIG. 3, in which there is a full pallet, the full pallet being located in a third detection zone of the detection means.

FIG. 6 shows the full pallet 12, in position against the stop.

It is noted that the zones 8, 9 and 10 of the scanner are activated. The robot is shown in the stopped position. However, it is not the presence of the full pallet 12 in the zone 9 that controlled the stopping of the robot 2, but the fact that there is no pallet in the left-hand operator intervention station 6 and the fact that the buffer zone 13 is full.

If a pallet had been present in the left-hand intervention station 6, detected by the sensor 20, and the door had in fact closed the left-hand opening, then the robot 2 would have been able to work on the pallet 12 of the left-hand station problem-free.

In order that the means 21 for control of the mode of operation of the robot 2 as a function of the zones 8, 9 and 10 of the scanner are operational again, it is necessary to comply with certain steps. In particular, it is necessary for the control means to detect the complete exit of the full pallet 12 from the installation.

To do this, monitoring is done to check that a certain message sequence is received by the control means 21:
  presence of the full pallet in the zone 10,
  presence of the full pallet in the zone 9, and
  presence of the full pallet in the zone 8.

The message sequence received must be this and in this order for the means 21 for control of the mode of operation of the robot to be uninhibited.

If the sequence is as follows:
  presence of the full pallet in the zone 10,
  presence of the full pallet in the zone 9, and
  presence of the full pallet in the zone 10;
then the installation will automatically secure itself and the power supply to the robot 2 will be cut. This sequence means that the pallet 12 has returned to the zone 10 again, which implies that there is a problem.

It is for this reason that, as a precaution, the securing of the installation is triggered.

Thus, the installation is equipped with safety control means, linked in particular to the monitoring of message sequences to be received by the control means 21.

Figure 11:
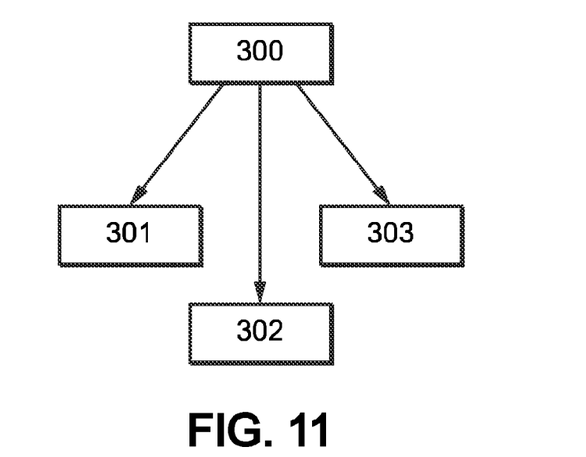
FIG. 11 is a third block diagram of a particular mode of operation of the installation according to the invention.

FIG. 11 diagrammatically shows what happens following the receipt, by the control means 21, of an indication of a full pallet 12:

Step 300 is a full pallet indication: this step 300 triggers: (i) a step 301 of opening the door 4, (ii) a step 302 of inhibiting the control of the mode of operation of the robot 2 as a function of a detection of an element in any one of the zones 8 to 10 of the scanner, and (iii) a step 303 of monitoring the message sequence indicating the complete exit of the full pallet.

Figure 7:
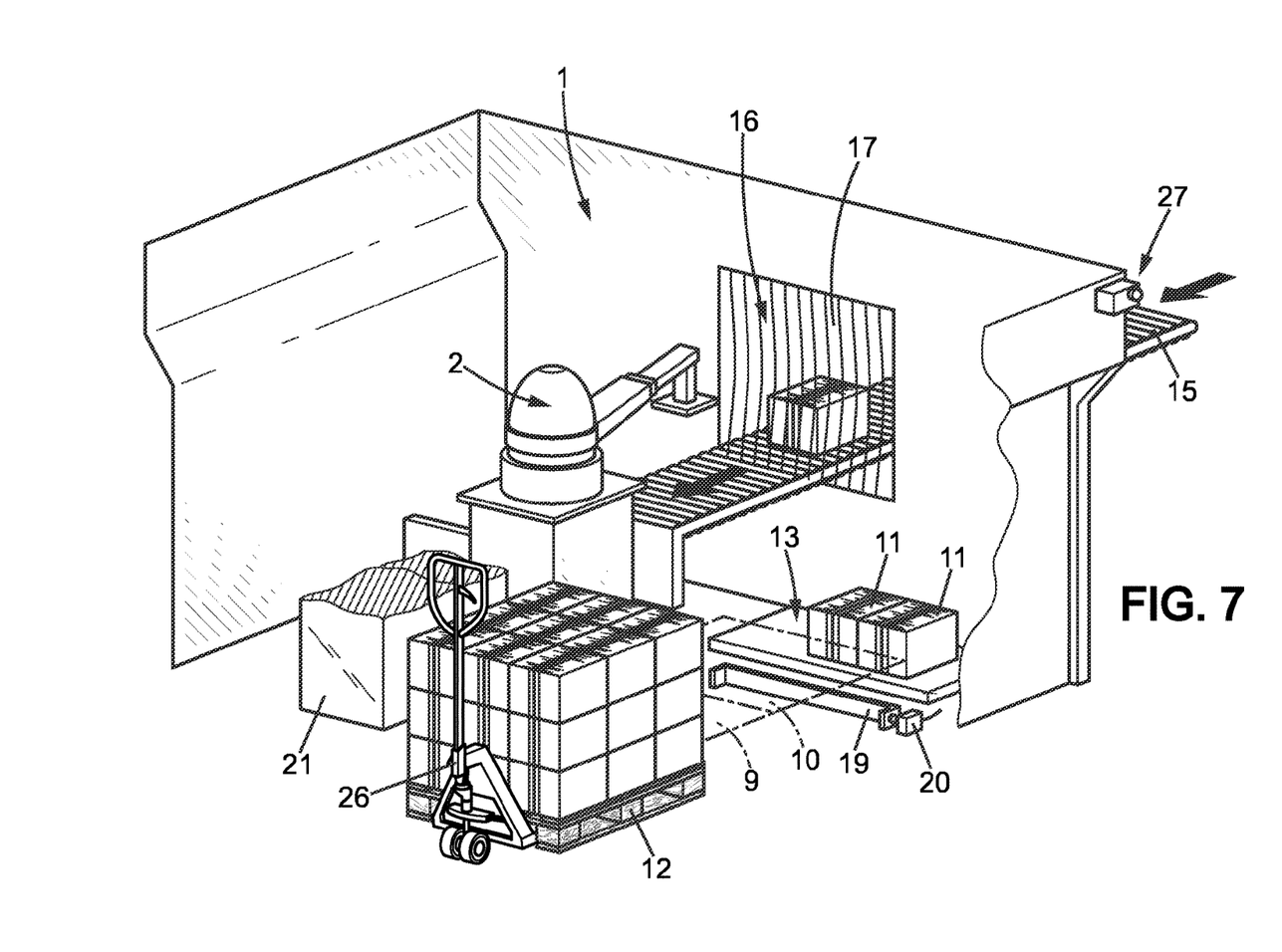
FIG. 7 shows the installation of FIG. 3, in which there is a full pallet, the full pallet being located in a second detection zone of the detection means.
Figure 8:
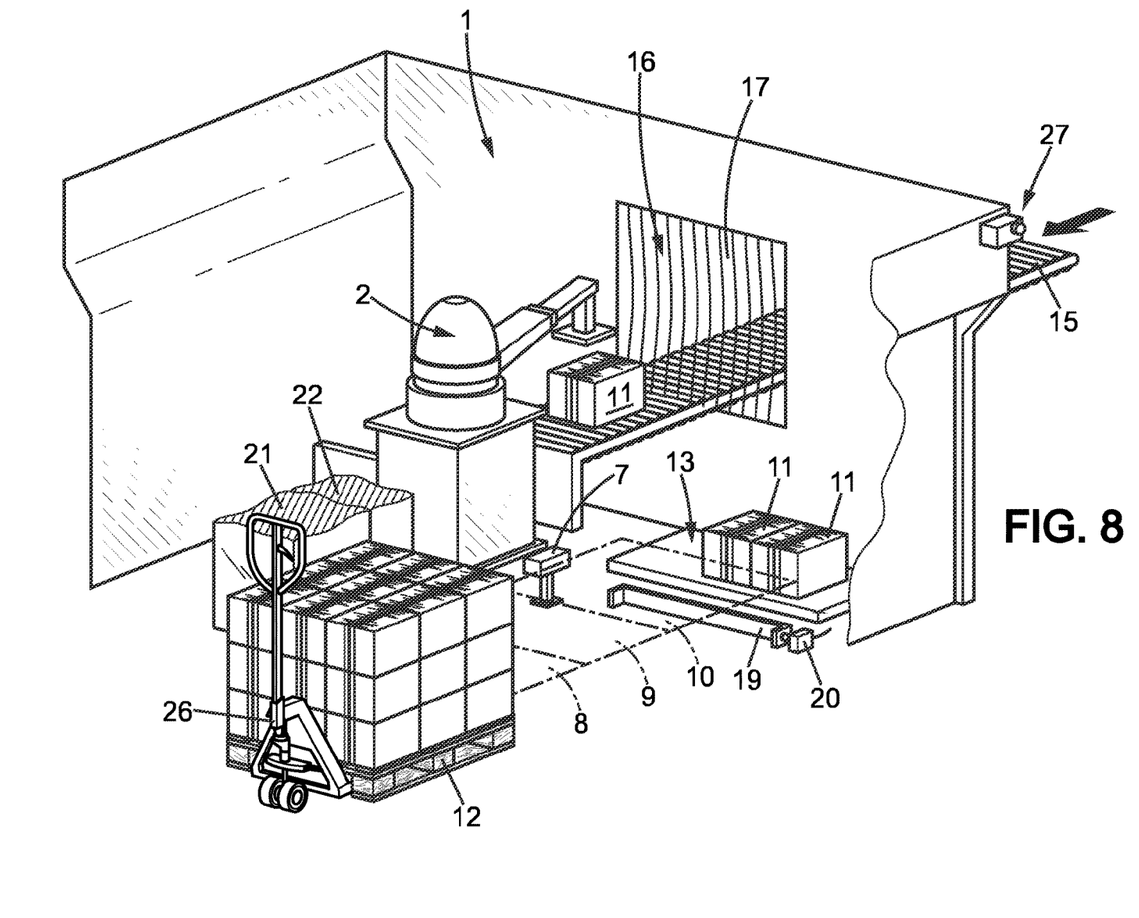
FIG. 8 shows the installation of FIG. 3, in which there is a full pallet, the full pallet being located in a first detection zone of the detection means.

FIGS. 6, 7 and 8 each show respectively the following steps:
presence of the full pallet in the zone 10 (FIG. 6),
presence of the full pallet in the zone 9 (FIG. 7), and
presence of the full pallet in the zone 8 (FIG. 8).

When this sequence is complied with, the means 21 for control of the mode of operation of the robot are uninhibited. The alarm can therefore be triggered again, and the robot can then be slowed down in its work or stopped again if an element is detected in the zones 8, 9 or 10 defined by the laser scanner 7.

It is thus understood how the control and safety means allow the robot 2 to work in the other intervention station 6 while the full pallet has not exited or allow the installation to be completely stopped if an abnormal sequence is identified during the exit of the full pallet, even before restarting the control of the operation of the robot 2 as a function of a detection of an element in a zone which is not intended to contain one behind an open door 4.

Because it should be noted that, when the door is closed, the scanner 7 is deactivated in the operator intervention station 6 which is placed behind it.

Figure 9:
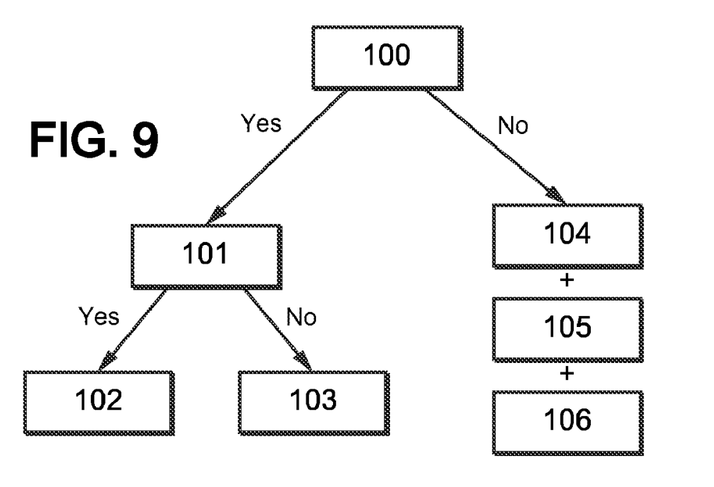
FIG. 9 is a block diagram of a mode of operation of the installation according to the invention.

FIG. 9 summarizes the operating conditions of each operator intervention station 6.

Step 100 indicates that the door 4 is closed in front of the opening 5 for access to an operator intervention station 6.

If the door 4 is closed ("yes" on the diagram), then in step 101 it is checked that the sensor 20 does detect a pallet present in the operator intervention station 6.

If the pallet is present ("yes" on the diagram), then in step 102 the robot 2 is authorized to work in said operator intervention station 6, in a predetermined normal work mode if there is a full pallet in the other station 6, or in a work mode which depends on a possible detection of an element in one of the zones 8 to 10 of the scanner of the other work station 6 if, in this other station, there is no pallet 12 or the pallet 12 is not full.

If the pallet is not present ("no" on the diagram), then in step 103 the robot is stopped until the sensor 20 detects the presence of a pallet.

If the door 4 is not closed ("no" starting from step 100), then the following steps 104, 105 and 106 are used:
104: activation of the detection means at the operator intervention station 6,
105: barring of the robot 2 from working at said operator intervention station 6,
106: activation of the means 21 for control of the mode of operation of the robot in the other operator intervention station 6 (the one in front of which the door 4 is closed).

Figure 10:
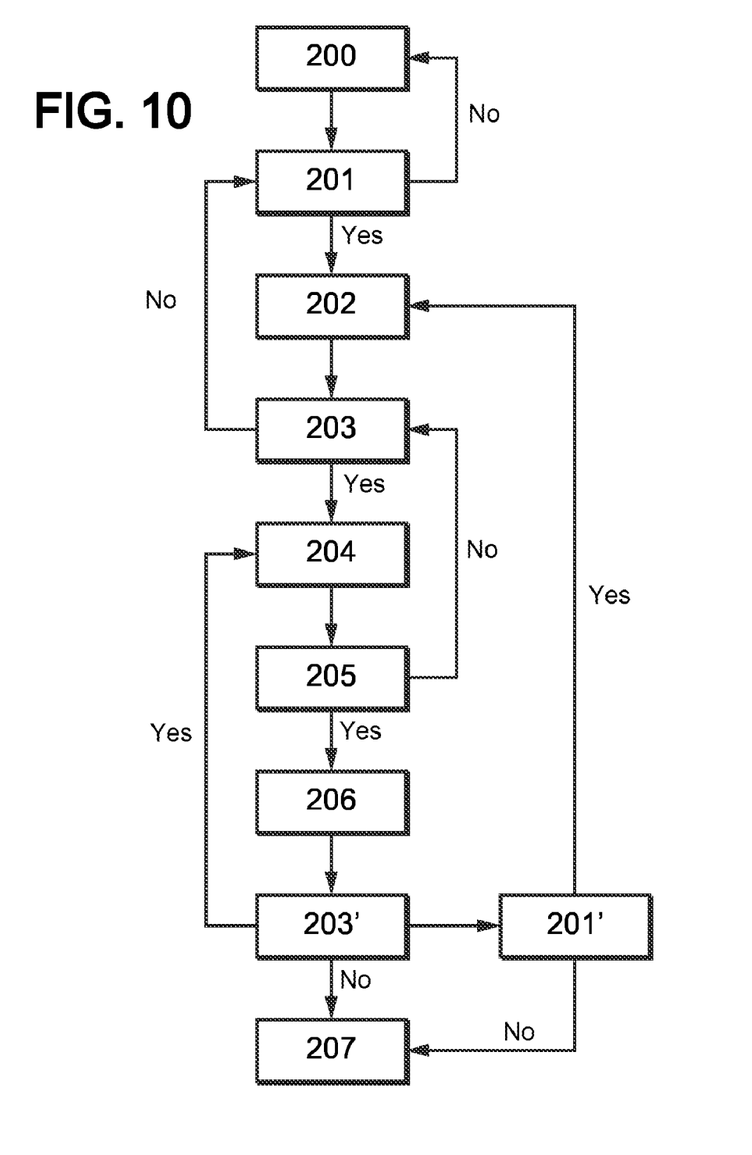
FIG. 10 is a second block diagram of a second mode of operation of the installation according to the invention.

FIG. 10 shows how the safety control means operate in an operator intervention station 6, after detection of an element in the zones 8 to 10.

Step 200 relates to a normal mode of operation of the robot 2 in an operator intervention station 6 (station 6 with its opening 5 closed by the door 4): specifically, the robot 2 stacks products 11 on a pallet 12 in a predetermined pattern.

Step 201 relates to the possible detection of an object in the zone 8 of the scanner of the other operator intervention station 6 (the one with its opening 5 not closed by the door 4). If an element is detected in zone 8 ("yes" on the diagram starting from 201), then the alarm 27 is triggered by step 202. If not ("no" on the diagram starting from 201), the robot continues to work normally.

Step 203 relates to the possible detection of an object in the zone 9 of the scanner of the other operator intervention station 6 (the one with its opening 5 not closed by the door 4). If an element is detected in zone 9 ("yes" on the diagram starting from 203), then a slowed-down mode of operation of the robot 2 is triggered by step 204. If not ("no" on the diagram starting from 203), step 201 is repeated, i.e. a query is raised as to whether a possible element is present in zone 8 in the other operator intervention station 6.

Step 205 relates to the possible detection of an object in the zone 10 of the scanner of the other operator intervention station 6. If an element is detected in zone 10 ("yes" on the diagram starting from 201), then the stopping of the robot 2 is triggered by step 206. If not ("no" on the diagram starting from 205), step 203 is repeated, i.e. a query is raised as to whether a possible element is present in zone 9 in the other operator intervention station 6.

Step 203' relates to the possible detection of an object in the zone 9 after the stopping of the robot 2 has been triggered in step 206. If an element is again detected in zone 9 ("yes" on the diagram starting from 203'), then step 204 is repeated, i.e. the mode of operation of the robot 2 in a slowed-down mode is triggered. If not ("no" on the diagram starting from 203'), the installation is secured by step 207 (complete stop of the installation), because this means that the item that went in has not come out again and has disappeared.

However, if the element has been detected in zone 2, and if the slowed-down mode of operation has been triggered, then step 201' consists of checking that the element detected in zone 9 does go back into zone 8 (step 201' in FIG. 10).

If the element has gone back into zone 8 ("yes" starting from 201' in FIG. 10) then step 202 is repeated (triggering of the alarm 27), if not ("no" starting from 201' in FIG. 10) then the installation is secured by step 207 (complete stop of the installation).

It is understood from the above that the installation according to the invention makes it possible to make a robot 2 work in a closed space even if an operator 25 has to enter a zone of this space, because it comprises means for ensuring his safety, such as in particular the zones defined by the scanner which, when it detects the presence of an object, make it possible to control or slow down the pace of the robot 2 or to stop it if the element enters too far into the space.

It is also understood that the installation still comprises means for completely securing the machine should anomalous circumstances arise, such as those in which an object enters and does not leave again, or leaves again in a strange manner (passing from zone 10 to zone 8 for example), indicating that the installation has a problem and that this requires the installation to be reviewed.

However, the installation presented in the figures does not limit the invention, which of course extends to the use of any equivalent means.

The invention claimed is:

1. An automated installation in which at least one robot is used in at least one mode of operation in at least one work zone, said installation comprising:
a closed space equipped with at least one door offering access to at least one operator intervention station, said at least one operator intervention station being situated in said work zone of said robot, detection means for detecting the presence of an element in said closed space at said operator intervention station, the detection means being arranged in said closed space to delimit at least two zones and detect incursion of an operator therein, and also being associated with control means for control of said at least one mode of operation of the robot, each zone delimited by the detection means being associated with one mode of operation of the robot, wherein the detection means are positioned at a predetermined height from a floor of said closed space, said height being greater than the height of an empty pallet, such that said detection means does not transmit a detection signal when the operator introduces an empty pallet in the operator intervention station, as the pallet passes below a detection level of the detection means; and wherein at least one of the two zones delimited by the detection means extends horizontally into the work zone of the robot into a space where the robot enters for depositing items onto the pallet.

2. The installation according to claim 1, wherein said at least two zones each associated with one mode of operation of the robot at least partially cover said at least one operator intervention station.

3. The installation according to claim 1, comprising two operator intervention stations comprised in said work zone of the robot, wherein the closed space comprises at least two openings for access to the two operator intervention stations and a door fitted so as to be mobile between said at least two openings, as well as sensors for the presence of the door at each of said at least two openings.

4. The installation according to claim 1, wherein the detection means delimit:
   a first zone in said closed space, said first zone controlling the triggering of a warning signal for the entry of said element into said closed space, and authorizes a mode of operation of the robot at a predetermined pace,
   a second zone in said closed space, said second zone controlling a mode of operation of the robot at a pace that has been slowed down compared with said predetermined pace,
   a third zone in said closed space, said third zone controlling the stopping of the operation of the robot.

5. The installation according to claim 1, wherein the detection means comprise a laser scanner of said closed space.

6. The installation according to claim 1, wherein the detection means comprise sensors.

7. The installation according to claim 1, wherein the detection means comprise a camera.

8. The installation according to claim 1, equipped with at least one sensor for the presence of a pallet in said at least one operator intervention station.

9. The installation according to claim 1, equipped with means for detecting a full pallet.

10. The installation according to claim 1, wherein the control means for control of said at least one mode of operation of the robot are associated with safety control means.

11. The installation according to claim 10, wherein the safety control means identify at least one sequence of modes of operation of the robot and authorize or do not authorize the robot which is at a stop to work again, or trigger the stopping of the installation.

12. The installation according to claim 1, wherein said at least one operator intervention station is a palletizing station and in that said detected element is an operator or a pallet truck.

13. An automated installation in which at least one robot is used in at least one mode of operation in at least one work zone, said installation comprising:
   a closed space equipped with at least one door offering access to at least one operator intervention station, said at least one operator intervention station being situated in said work zone of said robot,
   detection means for detecting the presence of an element in said closed space at said operator intervention station,
   the detection means being arranged in said closed space to delimit at least two zones and detect incursion of an operator therein, and also being associated with control means for control of said at least one mode of operation of the robot, each zone delimited by the detection means being associated with one mode of operation of the robot,
   wherein the detection means comprise a camera that scans said at least two delimited zones in the space, said at least two zones being situated above a predetermined height from a floor of said closed space, said height being greater than the height of an empty pallet, such that said detection means does not transmit a detection signal when the operator introduces an empty pallet in the operator intervention station, as the pallet passes below a detection level of the detection means; and
   wherein at least one of the two zones delimited by the detection means extends horizontally into the work zone of the robot into a space where the robot enters for depositing items onto the pallet.

14. An automated installation, comprising:
   a space equipped with a door offering access to an operator intervention station for placement and removal of pallets, the operator intervention station located at least in part in a first work zone within the space;
   a robot automatically controlled in a mode so that at least a portion of the robot moves within the first work zone to place items on or remove items from a pallet located in the first work zone;
   a detector that detects a physical presence of an object at the operator intervention station, the detector associated with a controller that controls operation of the robot in the mode;
   wherein the detector is positioned and oriented to detect objects above a predetermined height from a floor of the space, the height being greater than a height of an empty pallet so that the detector does not transmit a detection signal when the empty pallet is placed in the operator intervention station below the predetermined height and the detector transmits a detection signal when an operator enters the operator intervention station; and
   wherein the detector's field of detection extends horizontally within the first work zone of the robot, including where the robot moves for depositing items onto the pallet.

15. The installation according to claim 14, wherein when the operator enters the operator intervention station to place an empty pallet, at least one of an audible or a visual alarm is actuated due to the detector transmitting a detection signal.

16. A method of operating an automated installation, the method comprising:

providing the installation, which comprises:
- a robot controlled to operate in at least one mode of operation in at least one work zone of the installation;
- a closed space equipped with at least one door offering access to at least one operator intervention station, said at least one operator intervention station being situated in said work zone of said robot;
- detection means for detecting the presence of an element in said closed space at said operator intervention station;
- the detection means being arranged in said closed space to delimit at least two zones and detect incursion of an operator therein, and also being associated with control means for control of said at least one mode of operation of the robot, each zone delimited by the detection means being associated with one mode of operation of the robot;
- wherein the detection means are positioned at a predetermined height from a floor of said closed space, said height being greater than the height of an empty pallet, such that said detection means does not transmit a detection signal when the operator introduces an empty pallet in the operator intervention station, as the pallet passes below a detection level of the detection means; and
- wherein at least one of the two zones delimited by the detection means extends horizontally into the work zone of the robot into a space where the robot enters for depositing items onto the pallet; and operating said robot in the at least one mode of operation in the at least one work zone.

17. A method for using the installation according to claim 16, wherein the installation comprises two operator intervention stations in said work zone of the robot, wherein the closed space comprises at least two openings for access to the two operator intervention stations and a door fitted so as to be mobile between said at least two openings, as well as sensors for the presence of the door at each of said at least two openings; and wherein:

at the operator intervention station situated behind one of the openings for which the respective sensor detects the presence of the door, the control means control the use of a mode of operation of the robot in the operator intervention station situated behind the door; and wherein, at the operator intervention station situated behind an opening for which the respective sensor does not detect the door, the control means bar the robot from having access, and activate the use of the detection means.

18. The method for using the installation according to claim 16, wherein the control means for control of said at least one mode of operation of the robot are associated with safety control means, wherein the safety control means identify at least one sequence of modes of operation of the robot and authorize or do not authorize the robot which is at a stop to work again, or trigger the stopping of the installation; and wherein said at least one sequence of modes of operation is as follows:
- detection of an intrusion in a first warning zone not changing the mode of operation of the robot and triggering an audible or visual indicator,
- detection of an intrusion in a second zone controlling an operation of the robot at a slowed-down pace,
- detection of an intrusion in a third zone controlling the stopping of the robot,
- detection again of an intrusion in said second zone, and detection again of an intrusion in said first zone.

19. The method for using the installation according to claim 16, wherein the installation is equipped with means for detecting a full pallet, and when a pallet is full, the following steps are carried out:
- triggering of the opening of the door to authorize access to said operator intervention station,
- inhibition of the means for control of the mode of operation of the robot, monitoring of a complete exit of said full pallet from said installation by detecting the presence of the full pallet in a third zone, then in a second zone, then in a first zone delimited by said detection means of said installation.

* * * * *